Patented June 6, 1950

2,510,431

UNITED STATES PATENT OFFICE 2,510,431

INSECTICIDAL COMPOSITION COMPRISING A DODECAHYDRO ACRIDANE

William D. Stewart and John H. Standen, Yonkers, N. Y., assignors to The B. F. Goodrich Company, New York, N. Y., a corporation of New York No Drawing. Application November 2, 1946, Serial No. 707,527

4 Claims. (Cl. 167—33)

This invention relates to insecticidal compositions and particularly to compositions which are useful in killing and controlling insects of the order Siphonaptera commonly called fleas.

We have discovered that compositions comprising an inert carrier and a dodecahydro acridane as the active ingredient are excellent insecticidal compositions being particularly effective in killing and controlling fleas. Our compositions are extremely effective flea insecticides when containing as little as 5% by weight or less of the dodecahydro acridane.

The insecticidal compositions of our invention are preferably prepared by intimately admixing the active ingredient, i. e., a dodecahydro acridane, with a greater amount of a biologically inert pulverulent solid material such as finely-divided talc, chalk, clays, diatomaceous earths or the like or wheat flour or the like, to form a dust or powder, but compositions comprising the active ingredient in aqueous suspension or dispersion or in solution in an organic solvent or in the form of an aerosol may also be prepared in the usual manner, and are included in our invention. All such compositions consist of the active ingredient together with a biologically inert base material which may be projected through suitable jets or nozzles and which is designated herein as an "inert carrier." Ordinarily, the proportion of the active ingredient in such compositions is less than that of the carrier and is preferably quite small, within the range of about 0.1 to 10% by weight, although, as will be understood by those skilled in the art, the proportion of active ingredient will vary according to the particular purpose for which the composition is used and is in no way critical.

The active ingredient of our compositions, which is highly toxic to fleas, is a dodecahydro acridane of which the alkyl substituted dodecahydro acridanes are most effective. To simplify the discussion of these toxic compounds the following general structural formula is given with the positions identified by the numbering system now employed in Chemical Abstracts:

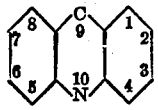

In the above general structural formula no attempt has been made to indicate the substituents in any of the positions, for the naming of the compounds below will indicate the position of the substituents. These dodecahydro acridanes may be prepared by complete hydrogenation of the corresponding acridanes, a reaction that proceeds smoothly and gives high yield of the dodecahydro compounds, particularly when a nickel or copper chromite hydrogenation catalyst is used. Thus, such acridanes as 9-benzyl-10-methyl acridane, 9,9-dimethyl-10-methyl acridane, 3,9-dimethyl acridane, 9,10-dimethyl acridane, 9-ethyl-10-methyl acridane, 9-isopropyl-10-methyl acridane, 9-methyl acridane, 9,9-diethyl acridane, 9,9-dimethyl acridane, 9,9-dibutyl acridane, 10-methyl acridane, 2,3-dimethyl acridane, 2,7-dimethyl acridane, 1-methyl acridane, 2-methyl acridane, 3-methyl acridane, and 4-methyl acridane, and other alkyl substituted acridanes as well as partially hydrogenated acridanes such as 3,4,6,7-tetrahydro-3,6-diisopropyl acridane can be hydrogenated to the corresponding decahydro acridane all of which are useful as the active ingredient of our compositions.

In the following specific examples presented to illustrate our invention the parts are by weight, and the compositions containing dichloro diphenyl trichloroethane (DDT) are employed therein as controls for the purpose of comparing the effectiveness of the compositions of our invention with that of one of the most effective compositions of the prior art.

Example I

A flea powder composition containing 10 parts of 9,9-dimethyl dodecahydro acridane and 90 parts of a finely-divided diatomaceous earth, known commercially as a diatomaceous earth and a control flea powder composition containing 10 parts of dichloro diphenyl trichloroethane and 90 parts of a diatomaceous earth were prepared. Several Petri dishes were dusted with a sufficient amount of one or the other of the above compositions to form a thin layer of the powder on the lower half of the dish. A known number of active, healthy dog fleas, Ctenocephalus canis, were placed in each dish and the fleas were observed periodically. After 15 minutes of exposure to the flea powders, the fleas in the dishes containing the dichloro diphenyl trichloro ethane powder were all alive while those in the dishes containing the dodecahydro acridane flea powder were twitching slightly but were otherwise inactive. All fleas in each test group were dead after one hour.

Example II

A composition containing 5 parts of 9,9-dimethyl dodecahydro acridane and 95 parts of a finely-divided diatomaceous earth, and a control composition comprising 5 parts of dichloro diphenyl trichloro ethane and 95 parts of a finely-divided diatomaceous earth were prepared. Petri dishes were powdered as before and fleas were deposited therein. It was noted that the fleas died immediately when they came into contact with the composition containing the dodecahydro acridane, while the fleas in the dishes containing the dichloro diphenyl trichloro ethane composition were still alive after 10 minutes, were only slightly paralyzed at 15 minutes, but were dead after one hour.

*Example III*

A composition containing 2.5 parts of 9,9-dimethyl dodecahydro acridane and 97.5 parts of a diatomaceous earth and a control composition containing 2.5 parts of dichloro diphenyl trichloro ethane and 97.5 parts of a diatomaceous earth were prepared and tested against fleas as described in the preceding examples. The composition containing the dodecahydro acridane killed 50% of the fleas in 15 minutes whereas none of the fleas were killed by the composition containing dichloro diphenyl trichloro ethane.

*Example IV*

A composition containing 10 parts of 2,7-dimethyl dodecahydro acridane and 90 parts of a diatomaceous earth was employed as above. This composition gave a 100% kill in only 15 minutes.

*Example V*

Example IV was repeated except that 9-methyl dodecahydro acridane was used in place of 2,7-dimethyl dodecahydro acridane. The fleas were paralyzed in 15 minutes and were all dead in 30 minutes.

*Example VI*

Fleas were also dipped into aqueous dispersions of the dodecahydroacridane containing 0.1% of the toxicant. Fleas immersed for 30 seconds were all dead within 15 minutes while fleas immersed in an aqueous dispersion containing 0.1% dichloro diphenyl trichloro ethane were not dead in 15 minutes.

Any of the dodecahydro acridanes prepared from the above-enumerated acridanes can be employed in the same manner as described in the above examples with substantially the same results.

The toxic effect of the dodecahydro acridanes is most unusual, for such similar compounds as acridines and acridanes, when evaluated according to the above tests possessed little or no insecticidal activity.

Although the compositions of this invention are particularly effective in killing insects of the order Siphonaptera, they may also be used in the control of numerous other insects.

While we have disclosed specific examples of our invention, we do not thereby desire nor intend to limit ourselves thereto for the precise proportions of the materials utilized can be varied or equivalent materials can be used without departing from the spirit and scope of our invention as defined in the appended claims.

We claim:

1. A dust composition toxic to fleas which comprises 0.1% to 10% by weight of a methyl dodecahydro acridane as the essential active ingredient and a pulverulent solid as a carrier therefor.

2. A dust composition toxic to fleas which comprises 0.1% to 10% by weight of 9,9-dimethyl dodecahydro acridane as the essential active ingredient and a finely-divided diatomaceous earth as a carrier therefor.

3. A dust composition toxic to fleas which comprises 0.1% to 10% by weight of 2,7-dimethyl dodecahydro acridane as the essential active ingredient and a finely-divided diatomaceous earth as a carrier therefor.

4. A dust composition toxic to fleas which comprises 0.1% to 10% by weight of 9-methyl dodecahydro acridane as the essential active ingredient and a finely-divided diatomaceous earth as a carrier therefor.

WILLIAM D. STEWART.
JOHN H. STANDEN.

REFERENCES CITED

The following references are of record in the file of this patent:

UNITED STATES PATENTS

| Number | Name | Date |
|---|---|---|
| 2,016,480 | Bockmuhl | Oct. 8, 1935 |
| 2,099,826 | Schaffer | Nov. 23, 1937 |